(12) United States Patent
Dayton

(10) Patent No.: US 8,621,798 B2
(45) Date of Patent: Jan. 7, 2014

(54) CONSTRUCTION INSULATING PANEL

(76) Inventor: Lionel E. Dayton, Norfolk, NE (US)

(*) Notice: Subject to any disclaimer, the term of this patent is extended or adjusted under 35 U.S.C. 154(b) by 248 days.

(21) Appl. No.: 12/978,709

(22) Filed: Dec. 27, 2010

(65) Prior Publication Data

US 2012/0159883 A1 Jun. 28, 2012

(51) Int. Cl.
*E04B 2/00* (2006.01)

(52) U.S. Cl.
USPC .......................... 52/289; 52/309.1

(58) Field of Classification Search
USPC .................. 52/235, 289, 309.1, 415, 424
See application file for complete search history.

(56) References Cited

U.S. PATENT DOCUMENTS

| | | | |
|---|---|---|---|
| 1,535,220 A | 4/1925 | Gallagher |
| 2,047,154 A | 7/1936 | Pimsner |
| 2,256,961 A | 9/1941 | Pearson et al. |
| 2,278,732 A | 4/1942 | Parsons |
| 2,575,941 A | 11/1951 | Brunnzell |
| 3,000,144 A | 9/1961 | Kitson |
| 3,003,810 A | 10/1961 | Kloote et al. |
| 3,159,235 A | 12/1964 | Young et al. |
| 3,343,474 A | 9/1967 | Shoda et al. |
| 3,368,473 A | 2/1968 | Shoda et al. |
| 3,387,420 A | 6/1968 | Long |
| 3,455,076 A | 7/1969 | Clarvoe |
| 3,619,961 A | 11/1971 | Sterrett et al. |
| 3,763,614 A | 10/1973 | Hyde et al. |
| 3,817,009 A | 6/1974 | Elder |
| 3,940,899 A | 3/1976 | Balinski |
| 4,021,981 A | 5/1977 | Van Wagoner |
| 4,224,774 A | 9/1980 | Petersen |
| 4,279,112 A | 7/1981 | Bertrand |
| 4,286,420 A | 9/1981 | Pharmakidis |
| 4,329,823 A | 5/1982 | Simpson |
| 4,375,741 A | 3/1983 | Paliwoda |
| 4,479,339 A | 10/1984 | Kroh |
| 4,492,064 A | 1/1985 | Bynoe |
| 4,512,130 A | 4/1985 | Pepin |
| 4,593,511 A | 6/1986 | Hakasaari |
| 4,635,419 A | 1/1987 | Forrest |

(Continued)

FOREIGN PATENT DOCUMENTS

| | | |
|---|---|---|
| AU | 21581/70 | 5/1972 |
| DE | 3407184 A1 | 9/1984 |

(Continued)

OTHER PUBLICATIONS

InSoFast Features; InSoFast Engineered Simplicity; InSoFast Panel Features; Apr. 13, 2012; pp. 1 and 2; http://www.insofast.com/isf_features.html.

(Continued)

*Primary Examiner* — William Gilbert
*Assistant Examiner* — Patrick Maestri
(74) *Attorney, Agent, or Firm* — Hahn, Loeser & Parks, LLP; Arland T. Stein

(57) ABSTRACT

A construction insulating panel includes a main body formed of a first polymer, and a mounting structure formed of a second polymer. The mounting structure is at least partially disposed within the main body and has cross members adapted to fasten mounting structure and thereby the insulating panel to a building structure under compressive loading to reduce formation of cold bridges through the insulation panel when an exterior finish material is fastened to the insulating panel.

24 Claims, 17 Drawing Sheets

(56) References Cited

U.S. PATENT DOCUMENTS

| | | | |
|---|---|---|---|
| 4,635,423 A | 1/1987 | Ward | |
| 4,637,187 A | 1/1987 | Campbell | |
| 4,653,246 A | 3/1987 | Hepler | |
| 4,669,240 A | 6/1987 | Amormino | |
| 4,677,800 A | 7/1987 | Roodvoets | |
| 4,712,349 A | 12/1987 | Riley et al. | |
| 4,761,928 A | 8/1988 | Pichette | |
| 4,804,578 A | 2/1989 | Crookston | |
| 4,918,893 A | 4/1990 | Vandenbroucke et al. | |
| 5,060,441 A | 10/1991 | Pichette | |
| 5,363,621 A | 11/1994 | Kroll et al. | |
| 5,758,464 A | 6/1998 | Hatton | |
| 5,857,292 A | 1/1999 | Simpson | |
| 6,415,562 B1 * | 7/2002 | Donaghue et al. | 52/177 |
| 6,609,340 B2 * | 8/2003 | Moore et al. | 52/309.11 |
| 7,481,032 B2 | 1/2009 | Tarr | |
| 7,984,591 B2 * | 7/2011 | Cashin et al. | 52/63 |
| 2005/0144901 A1 | 7/2005 | Egan et al. | |
| 2005/0178078 A1 | 8/2005 | Valentz et al. | |
| 2005/0229535 A1 | 10/2005 | Garner et al. | |
| 2008/0168728 A1 * | 7/2008 | Scherrer | 52/309.11 |
| 2009/0042471 A1 | 2/2009 | Cashin et al. | |
| 2010/0058700 A1 | 3/2010 | Leblang | |

FOREIGN PATENT DOCUMENTS

| | | |
|---|---|---|
| FR | 2573458 B1 | 10/1987 |
| GB | 961133 | 6/1964 |
| JP | 56-17249 | 2/1981 |
| RU | 775258 | 10/1980 |

OTHER PUBLICATIONS

The reFIT system catalog of products; one page; refiticf.com.
reFIT system tri-fold brochure; 2010 ARXX Corporation; two pages; refiticf.com.
International Search Report and Written Opinion of PCT/US2011/066759.

* cited by examiner

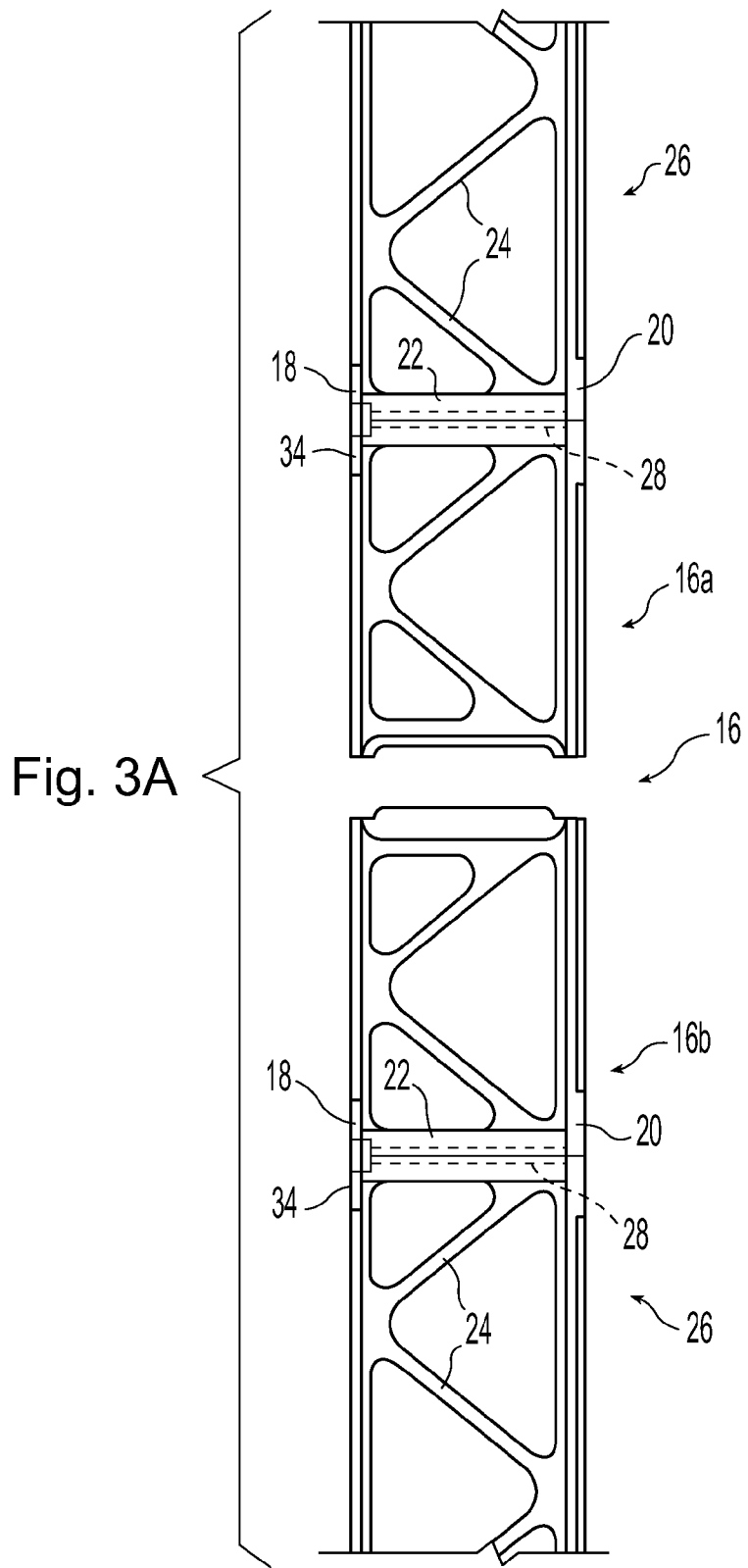

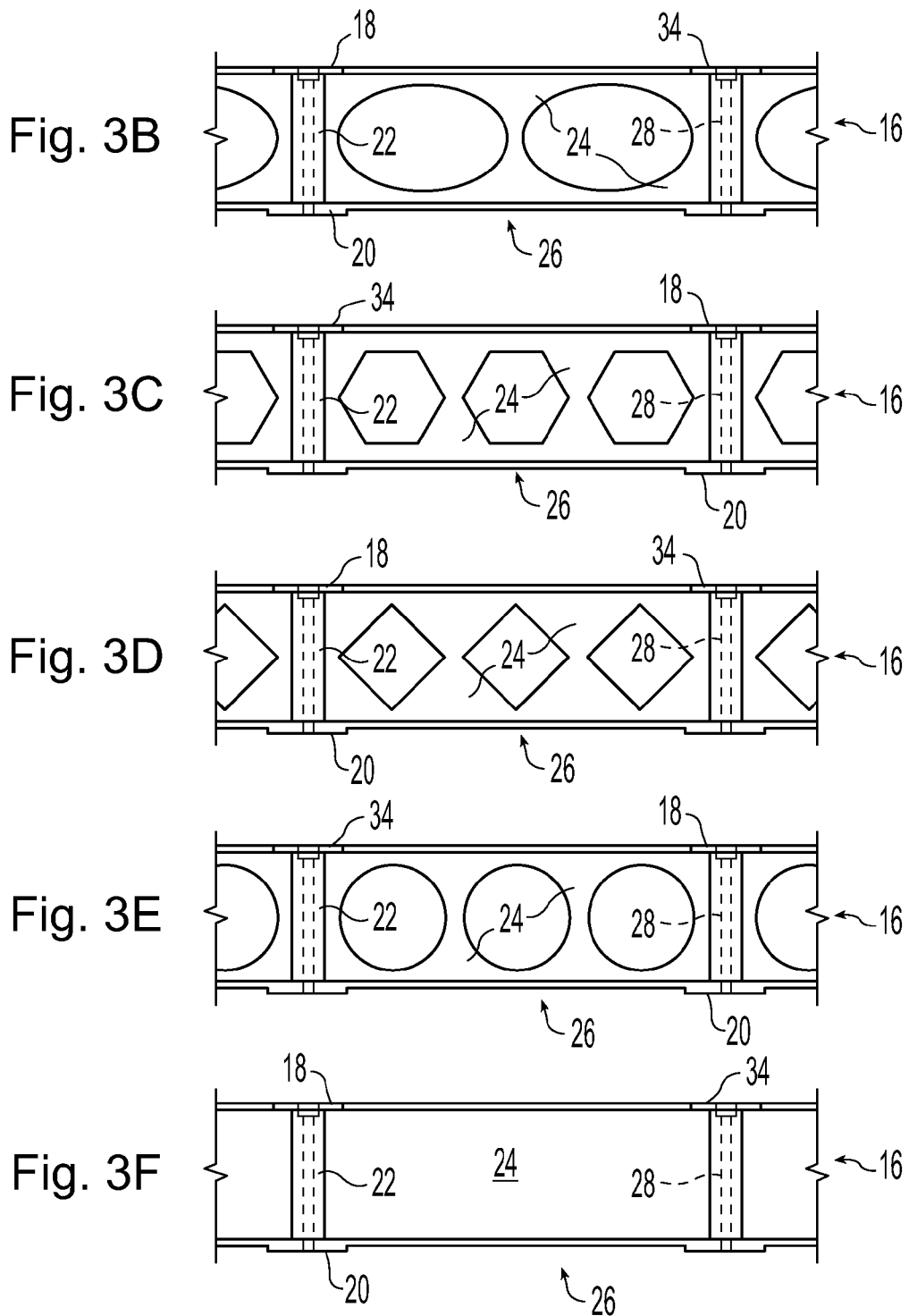

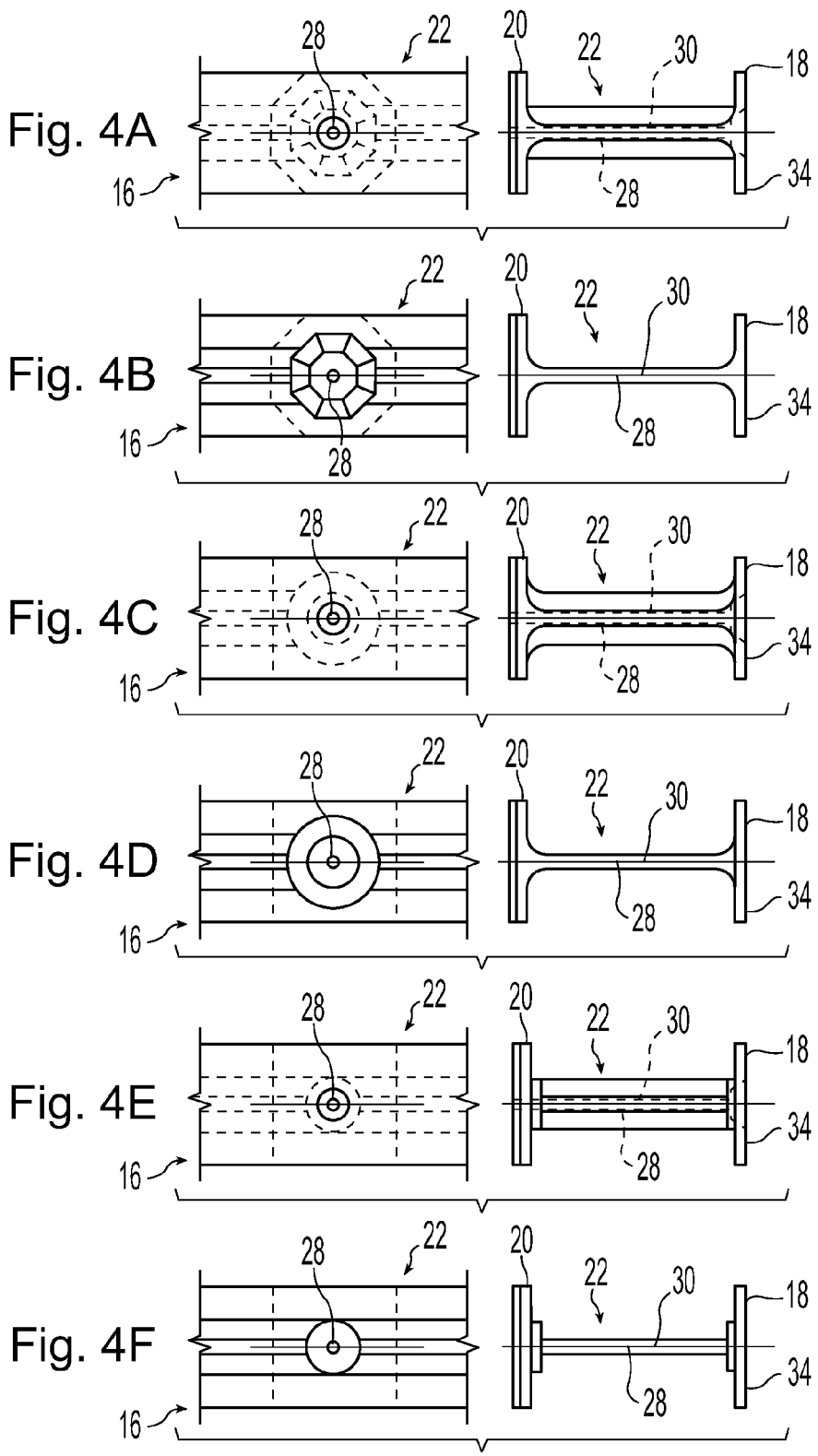

CONSTRUCTION INSULATING PANEL

BACKGROUND AND SUMMARY

This disclosure relates in general to thermal insulation for building structures including residential or commercial buildings, such as single residential houses, condominiums, town houses, and apartment buildings as well as office buildings, plants, warehouses, retail structures, farm buildings and the like.

It is known to add thermal insulation to the exterior walls and roofs of building structures to reduce the heat loss or gain from the interior of the structure to the outside environment. Insulation, such as fiberglass or cellulose may be placed between the studs, joists or rafters inside walls, ceilings or roofs. Also, batt insulation or insulation blankets may be draped between and over studs, joists or rafters. For example, in the case of a roof, batt insulation may be draped over purlins and roof decking may be attached to the purlins with the batt insulation being compressed between the roof decking and the purlins. Additionally, insulation, such as polystyrene panels, may be placed over the studs, joists or rafters of the exterior of walls or roofs before the application of an exterior finish, such as an exterior siding or roofing.

In the past, "cold bridges" formed across insulation panels between the interior of a structure and the exterior environment and was a serious problem creating localized areas of large heat loss or gain. Especially in colder climates, cold bridges through exterior insulation panels attached to the exterior of building structures under siding and shingles has been a serious source of heat loss driving heating costs and localized material damage, for example from condensation causing corrosion, mold, or rot.

Typically, in the past, rigid insulation, such as polystyrene panels, was attached to the exterior of cold formed steel (CFS) and wood studs. Such polystyrene panels typically do not maintain enough stiffness to allow the attachment of exterior finishes such as wood, synthetic or composite siding, or an exterior veneer such as brick, stone, or the like, directly to the polystyrene panels. Exterior finishes and veneers require fasteners attached through the polystyrene panels to the support structure to support the exterior finishes or veneers. The fasteners themselves may act as thermal conductors to form "cold bridges." Moreover, these fasteners, which are typically case hardened and not meant to be in bending, typically cantilever through the rigid insulation panels creating openings, particularly over time, in the insulation panels allowing passages, air flow, and moisture transfer. Cold bridges, thus formed, also allow for corrosion and mold to form within the building structure in addition to heat loss.

What has been needed is an exterior insulation panel, especially in more generally hot or cold climates, that inhibits, if not eliminates "cold bridges" in such structures, substantially reduce if not eliminate water condensation in the insulation panel and the building structure, and can functionally support exterior finishes and veneers.

Disclosed is an insulation panel that may be used in the construction industry to provide more energy efficient building structures in both cold and hot weather environments by inhibiting "cold bridges" through the panel between the interior and exterior surfaces. The construction insulation panel comprises a main body formed of a first polymer having an exterior surface and an interior surface forming the opposite major surfaces of an insulating panel; and a mounting structure formed of a second polymer having a higher tensile strength and more rigidity than the first polymer. The mounting structure comprises at least one interior support member adapted to be positioned adjacent the interior surface of the main body, at least one exterior support member adapted to be positioned adjacent the exterior surface of the main body, and a plurality of spaced apart cross members extending between the interior support member and the exterior support member each having at least a virtual or an actual passage adapted to receive a first fastener adapted to fastening the mounting structure to a building structure under compressive loading. As used herein, the term "compressive loading" is intended to include the application of force upon a relatively compressible material where the material is physically compressed and deforms, or the application of force upon a more rigid material where the material is under physical stress, or a combination of both. In any case, the mounting structure is at least partially disposed within the main body and forms with the main body an insulating panel adapted to be fastened to a building structure and to support an exterior finishing material fastened at the exterior surface of the main body of the insulating panel to inhibit cold bridging.

The mounting structure may have a webbing between cross members so the webbing with the mounting structure forms a truss member. The web may be formed with the cross members as an imbedded truss. In either of the alternatives, the mounting structure may be fully disposed or partially disposed within the main body as desired in the particular embodiment. The mounting structure may be full encapsulated by the main body or a portion of the mounting structure may extend outside the main body. Accordingly, the mounting structure may be encapsulated in the main body or part of the either the interior surface or exterior surface, or both.

The cross members of the insulating panel may have virtual or actual passages therein shaped to cause the insulating panel to be place under compressive loading when fastened by first fasteners to a building structure. Such passages may be all virtual or actual preformed passages. The exterior portions of the first fasteners may be generally flush with or recessed from the exterior surface of the main body when positioned to fasten the insulating panel to a building structure.

The mounting structure may be one interior support member and one exterior support member, e.g., positioned substantially aligned to a building frame structure when the panel is installed, or a plurality of interior support members and a plurality of exterior support members spaced apart and coordinated to support the insulation panel and exterior finish material when fastened on a building structure. For example, the support members of the mounting structure may be spaced apart a distance corresponding to the spacing of wall studs or other building members in a building structure. In any case, the exterior support member is typically adapted to receive a second fastener capable of supporting an exterior building material to the insulating panel. Additionally, the insulating panel may be adapted to accommodate openings in buildings, such as windows or doors. As such, the insulating panel may be cut, trimmed, framed and/or fastened especially for desired windows, doors and other building openings in the desired embodiment The insulating panel may also have alignment markings disposed on the exterior surface (on the main body and/or the exterior member of the mounting structure) to indicate the location of the cross members and passages therein to facilitate fastening of the insulating panels to a building structure and/or to indicate the location of the exterior support member to facilitate fastening of a exterior finish material to the insulation panel.

The main body of the insulating panel may include a UV-absorbing additive or have a UV-absorbing coating on the exterior and/or interior surface. The main body of the insulating panel may additionally or alternatively may include an antioxidant additive or coating on the exterior and/o interior surface.

The insulating panels may have at least some of the edge portions off-set so that adjacent panels may be assembled in a building structure overlapped laterally to provide strength and inhibit cold bridges between insulating panels. Additionally, each insulating panel may have a multi-piece mounting structure to adjoin upwardly and downwardly with edge portions of adjacent insulating panel having concave and convex rounded edge portions on opposite edge portions along their length so as to nest within the panel to avoid cold bridging between insulating panels. Alternatively the configuration of such adjoining edge portions may be of any desired complimentary configuration suitable to avoid cold bridging between adjoining edge portions of adjacent insulating panels.

A film adapted to provide durability to the insulating panel may be applied to the exterior surface or interior surface, or both, The durable film may have a pre-applied adhesive or an adhesive applied as the film is applied to the exterior surface and/or the interior surface. The film may provide sufficient strength to the insulating panel that the insulating panels may support workers when the insulating panels are in place on a building structure. This film may be particularly helpful where the insulating panels are adapted to be use as sub-roofing over purlins or roofing rafters.

Various aspects of the present invention will become more apparent to those skilled in the art from the following detailed description and the accompanying drawings.

BRIEF DESCRIPTION OF THE DRAWINGS

FIG. 3A is a side view of alternative overlapping portions of two adjacent panels;

FIG. 3B is a side view of the alternative mounting structure defining oval shaped apertures;

FIG. 3C is a side view of an alternative mounting structure defining hexagonal shaped apertures;

FIG. 3D is a side view of an alternative mounting structure defining diamond shaped apertures;

FIG. 3E is a side view of an alternative mounting structure defining circular shaped apertures;

FIG. 3F is a side view of an alternative mounting structure having a solid web;

FIG. 4A is a plan view and a side cross sectional view of a first alternative cross member, FIG. 4B is a plan view and a side cross sectional view of a second alternative cross member, FIG. 4C is a plan view and a side cross sectional view of a third alternative cross member, FIG. 4D is a plan view and a side cross sectional view of a fourth alternative cross member, FIG. 4E is a plan view and a side cross sectional view of a fifth alternative cross member, FIG. 4F is a plan view and a side cross sectional view of a sixth alternative cross member.

DETAILED DESCRIPTION

Figure 1:
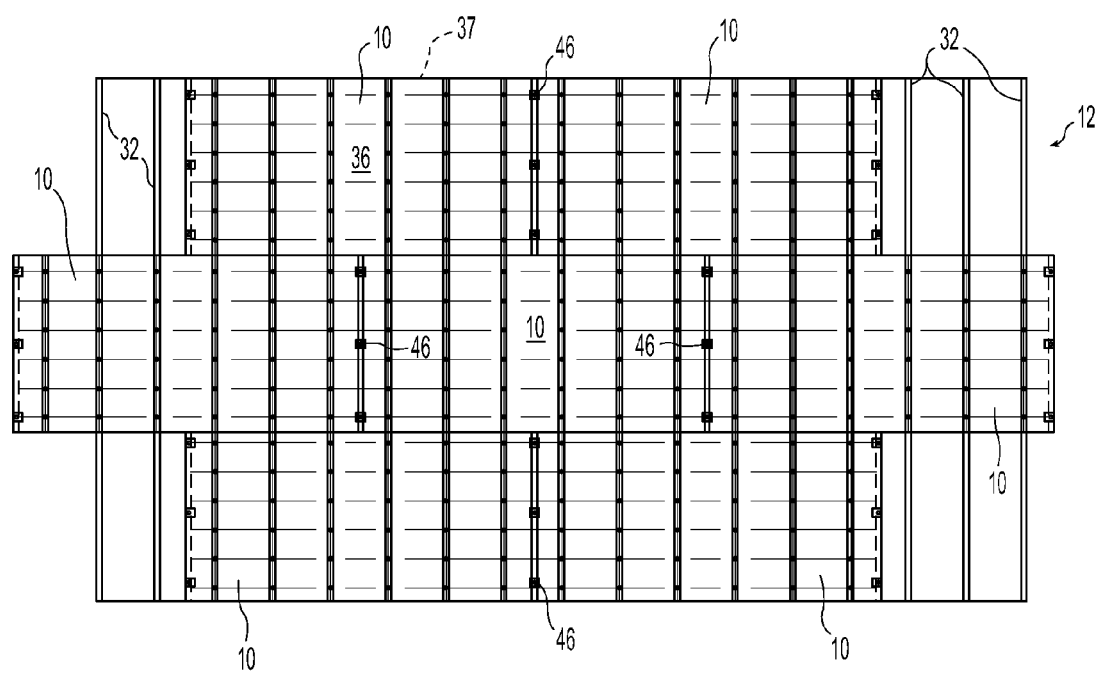
FIG. 1 is a partial front elevation view of a series of insulation panels installed on the exterior of a portion of a building structure.

Referring now to the drawings, there is illustrated in FIG. 1 a series of construction insulation sheets or panels 10 installed on the exterior portion of a building structure 12.

Figure 2:
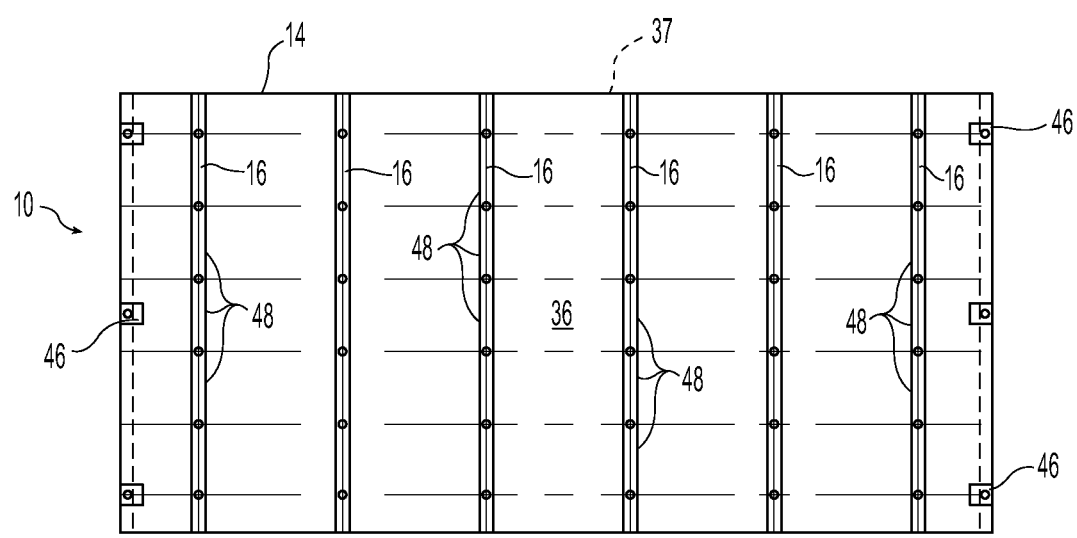
FIG. 2 is an enlarged view of one insulation sheet of FIG. 1.
Figure 3:
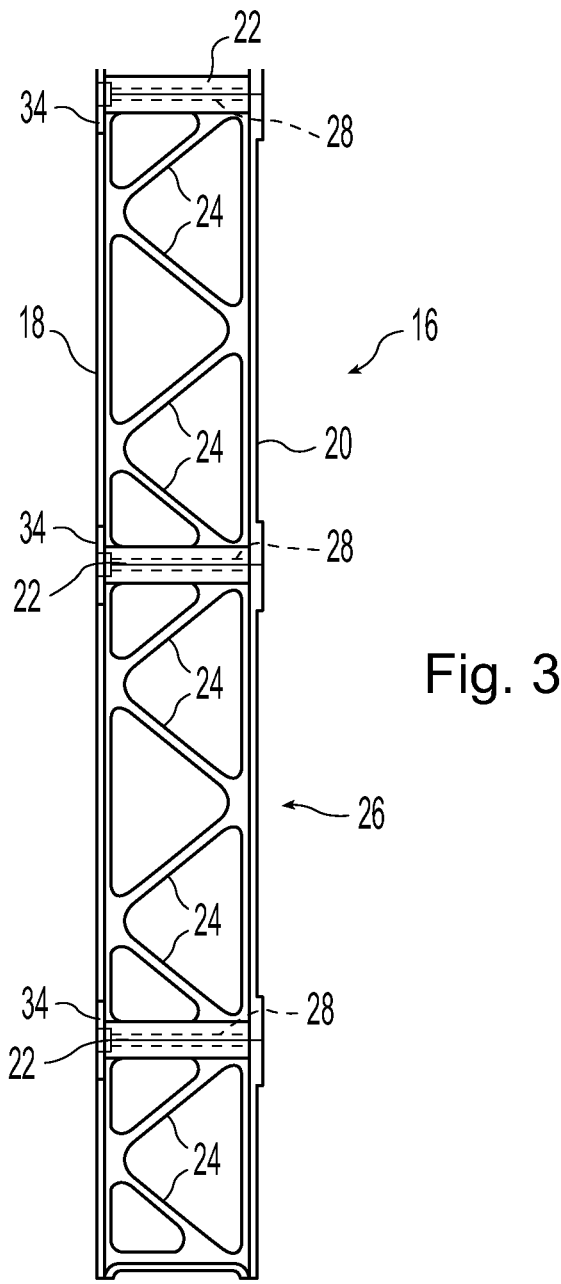
FIG. 3 is a side view of the mounting structure of FIG. 2.

As shown in FIG. 2, the construction insulating panel 10 includes a main body 14 made of a first polymer and having an exterior surface 36 and interior surface 37 forming opposite major surfaces of insulating panel 10. The first polymer may be polystyrene, e.g. an extruded polystyrene foam such as Styrofoam®, polyurethane, polyisocyanurate, or other suitable polymer material. There is shown in FIG. 3 a mounting structure 16 and formed of a second polymer having a higher tensile strength and rigidity than the first polymer. The second polymer may be a thermoplastic, such as polypropylene, polystyrene, polyethylene, polyvinylchloride (PVC), or acrylonitrile butadiene styrene (ABS), or other polymer material. The relative thickness of the main body 14 may be selected as desired to provide an amount of thermal insulation and/or vapor barrier for the particular embodiment.

The mounting structure 16 includes an exterior support member 18, an interior support member 20 and cross-members extending there between. The exterior support member 18 and the interior support member 20 may be contiguous members positioned adjacent and along the exterior and interior surfaces of the main body 14 of the insulating panel 10, or a plurality of exterior support members 18 and the interior support members 20 spaced apart adjacent and along the exterior and interior surfaces of the main body 14 of the insulating panel 10. In any event, exterior support member 18 and interior support member 20 are adapted to provide support for the insulating panel when secured to a building structure with first fasteners 30 through cross-member 22 to attach the insulating panel 10 to the building structure under compressive loading, and finishing exterior materials are attached to the exterior surface of the insulating panel with second fasteners 38. A plurality of cross-members 22 extends between the support exterior support member(s) 18 and the interior support member(s) 20 each having at least a virtual passage adapted to receive first fasteners 30 adapted to fasten the mounting structure 16 and in turn the insulating panel 10 to a building structure under compressive loading. Between the exterior and interior support members 18 and 20 and cross-members 22 may be a web 24 forming a truss 26, optionally with cross members 22 and exterior and interior support members 18 and 20, disposed wholly or partially in main body 14.

Alternatively, the mounting structure 16 may be formed as separate pieces 16a and 16b which are joined together in an assembly of mounting structure 16 and installation of the insulating panel 10. For example, the separate pieces 16a and 16b may couple together by mechanical fastening mechanisms, such as screws or slots and tabs, or by chemical bonding, such as adhesives or plastic welding.

Figure 9:
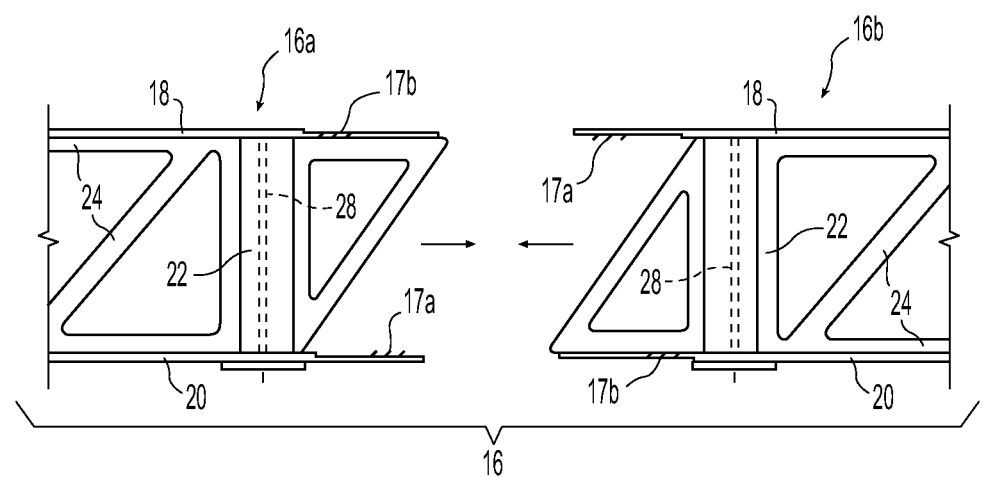
FIG. 9 is a partial side view of alternative interlocking portions of two pieces of mounting structure.

Web 24 may be provided as shown in FIGS. 3 and 3A as part of the mounting structure 16, with a number of triangular shaped apertures in the mounting structure 16. As shown in FIG. 3A, adjoining edge portions of mounting structure pieces 16a and 16b may be formed to provide a complementary facing structure. Further, the pieces of mounting structure 16a and 16b may be configured as separate interlocking pieces 16a and 16b that may, for example, snap together at male and female tabs 17a and 17b to form mounting structure 16 as shown in FIG. 9. It is to be understood, that the web 24 may be in the form of any suitable shaped apertures. To illustrate, webs 24 may be oval shape as shown in FIG. 3B, hexagon shape as shown in FIG. 3C, diamond shape as shown in FIG. 3D, circle shape as shown in FIG. 3E, or square, rectangle, pentagon, hexagon, or other conic sections, quadrilateral or polygon shape as desired. Alternatively, the mounting structure 16 may have a solid web as shown in FIG. 3F.

Figure 5:
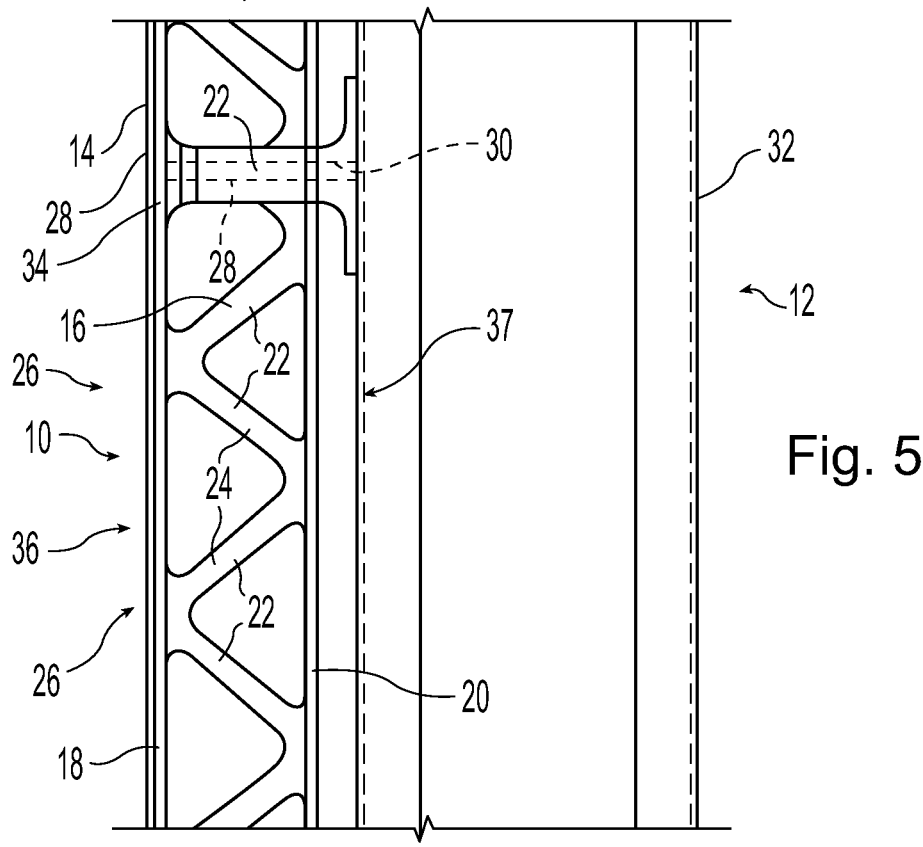
FIG. 5 is a side cross sectional view of the insulation sheet and CFS stud of FIG. 4.
Figure 6:
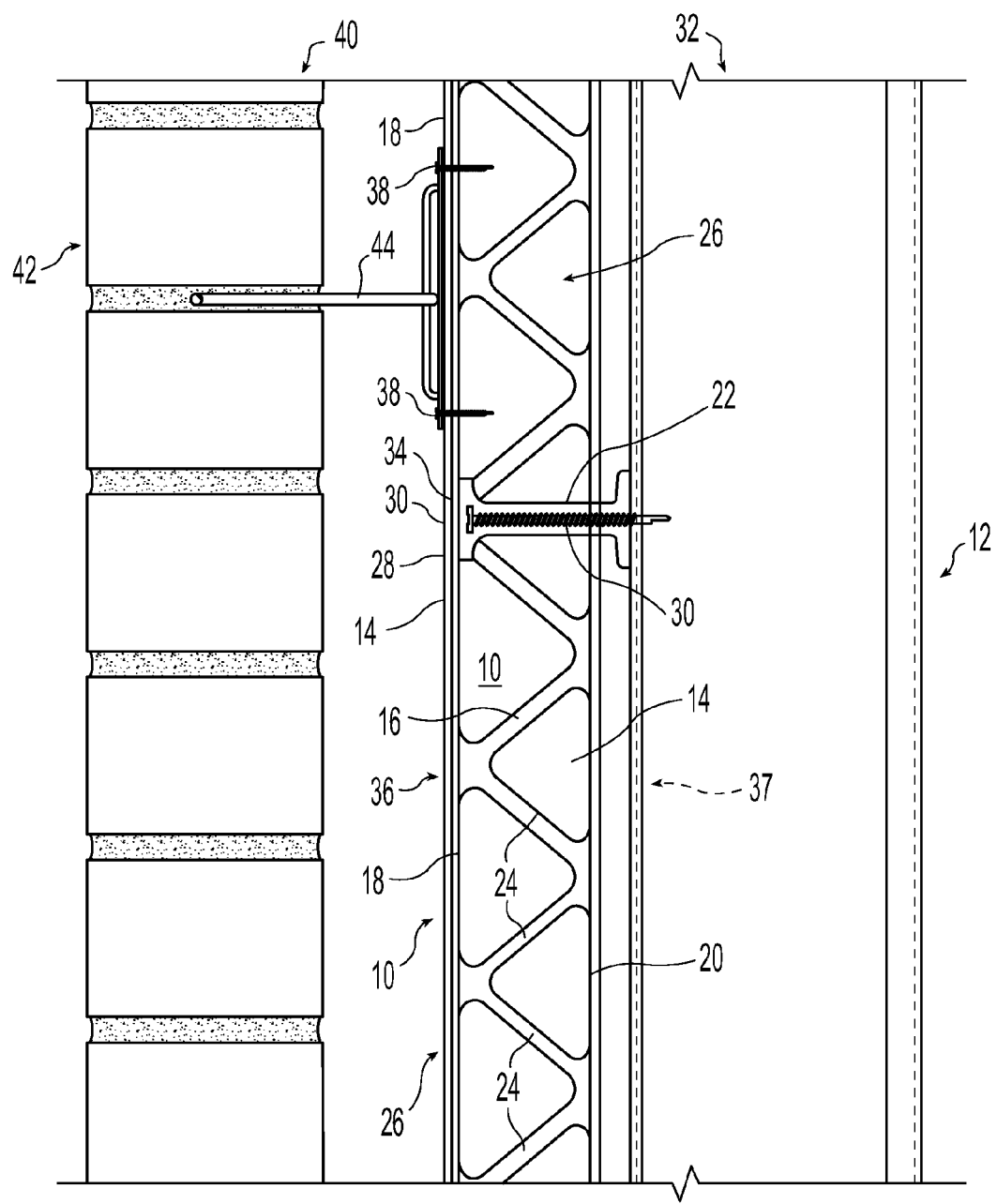
FIG. 6 is a side cross sectional view similar to FIG. 5 showing a brick veneer attached to the mounting structure of the insulation panel.

As shown in FIGS. 5 and 6, in a variety of embodiments, the mounting structure 16 may be fully disposed within the main body 14. Alternatively, the mounting structure 16 may be at least partially disposed within the main body 14. In any case, where the cross-members 22 are generally disposed within the main body 14, the web 24 optionally with cross-members 22 and exterior and interior support members 18 and 20, forms a truss 26 embedded in the main body 14. In such a case, during manufacture, the material forming the main body 14 may be delivered in a foam or fluid state into and through the web 24 of mounting structure 16, and then allowed to solidify or cure in place. Alternatively, the exterior support member 18 and/or the interior support member 20 may be contiguous with or part of the exterior surface 36 and interior surface 37 of the main body 14 of the insulating panels 10.

As noted, the cross members 22 in the mounting structure 16 includes at least virtual passages 28 extending between the exterior support member(s) 18 and interior support member(s) 20 to provide for support of insulating panels with installation of first fasteners 30, with the interior support member(s) 20 attached to the building structure to fasten the insulating panel 10 to a building structure under compressive loading. Virtual passages are such that openings may be formed there through in the cross member 22 as first fasteners 30 are extending through the cross member. Alternatively, the passages 28 may be all ready formed partial or complete openings in the cross members 22. In any case, the first fastener 30 may be used to extend through the cross members 22 from the exterior support member 18 to and through the interior support member 20 into the building structure material (such as metal or wood stud 32), mounting the insulating panel 10 under compressive loading to the portion of the building structure 12, such as cold formed steel (CFS) studs or wood studs. Additionally, it is to be understood that the insulation panel 10 may be mounted to a cement based building such as concrete masonry units (CMU) or concrete block with any appropriate fasteners as first fasteners 30. In any event, the compressive loading may be provided as the first fastener 30 is seated, or when the first fastener 30 is secured in place, or both. The level of compressive loading, and when and how it is provided, is dependent on the fastener style of first fastener 30, building structure and its composition, and the degree of support needed for any materials fastened by second fasteners 38 to the insulating panel 10 in the particular embodiment The cross member 22 may be formed in suitable geometry, such as a polygon as shown in FIGS. 4A and 4B. The cross member may have passages 28 formed there though such as shown in FIGS. 4A, 4C, and 4E, or may have virtual passages 28 such as indicated in FIGS. 4B, 4D and 4F. Additionally the cross members 22 may be formed in any suitable size such as relatively large cross members 22, as shown in FIG. 4C, or a relatively small cross member 22, as show in FIG. 4F.

Figure 4:
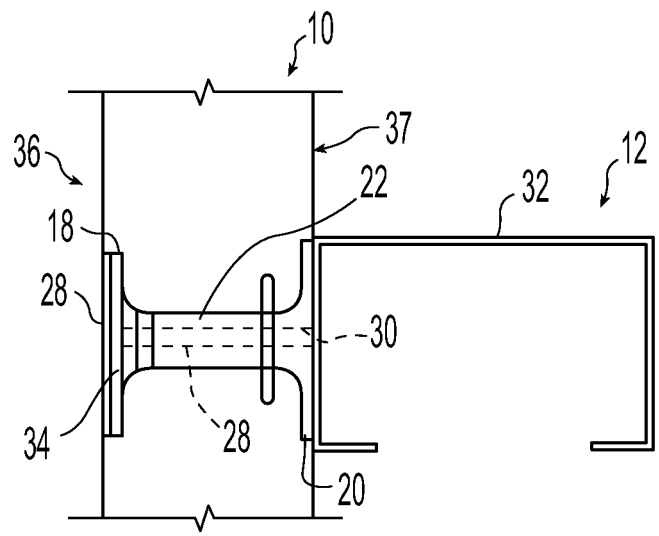
FIG. 4 is a top cross sectional view of the insulation sheet of FIG. 2 attached to a CFS stud of the building structure of FIG. 1.
Figure 5A:
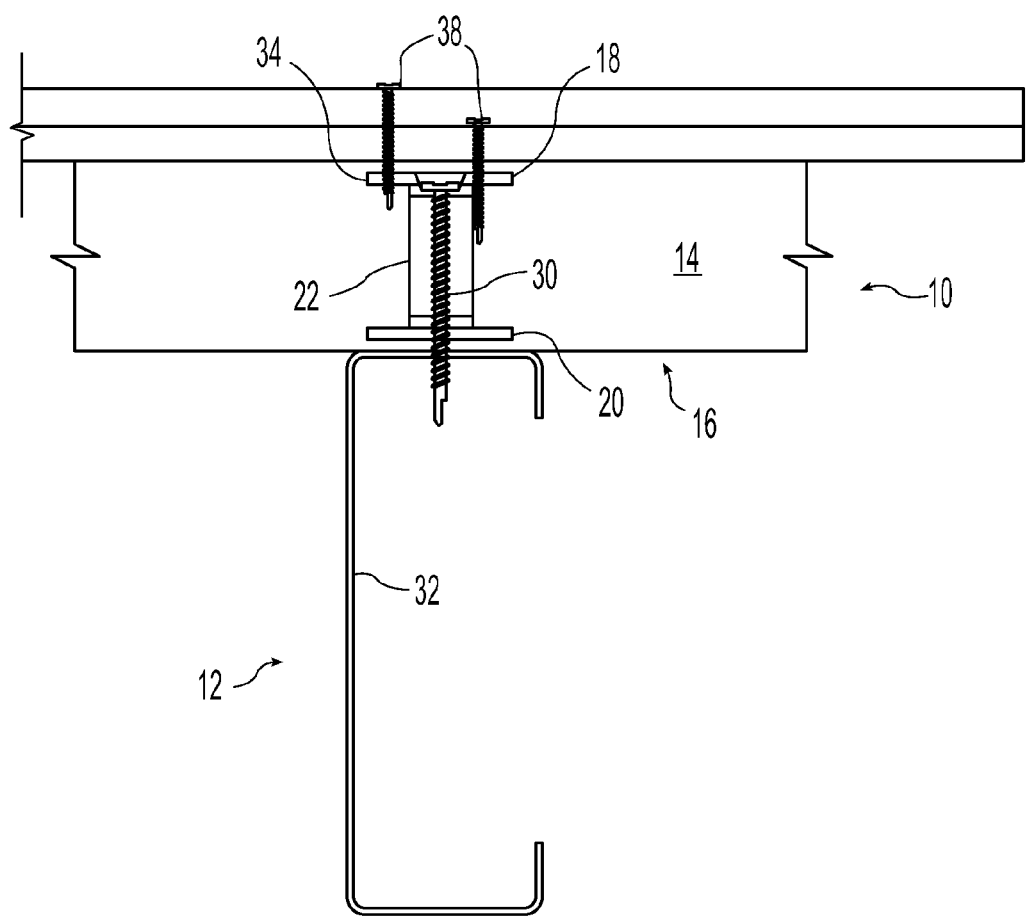
FIG. 5A is a view similar to FIG. 4 of an alternative installation of an insulation sheet, and including siding material.
Figure 5B:
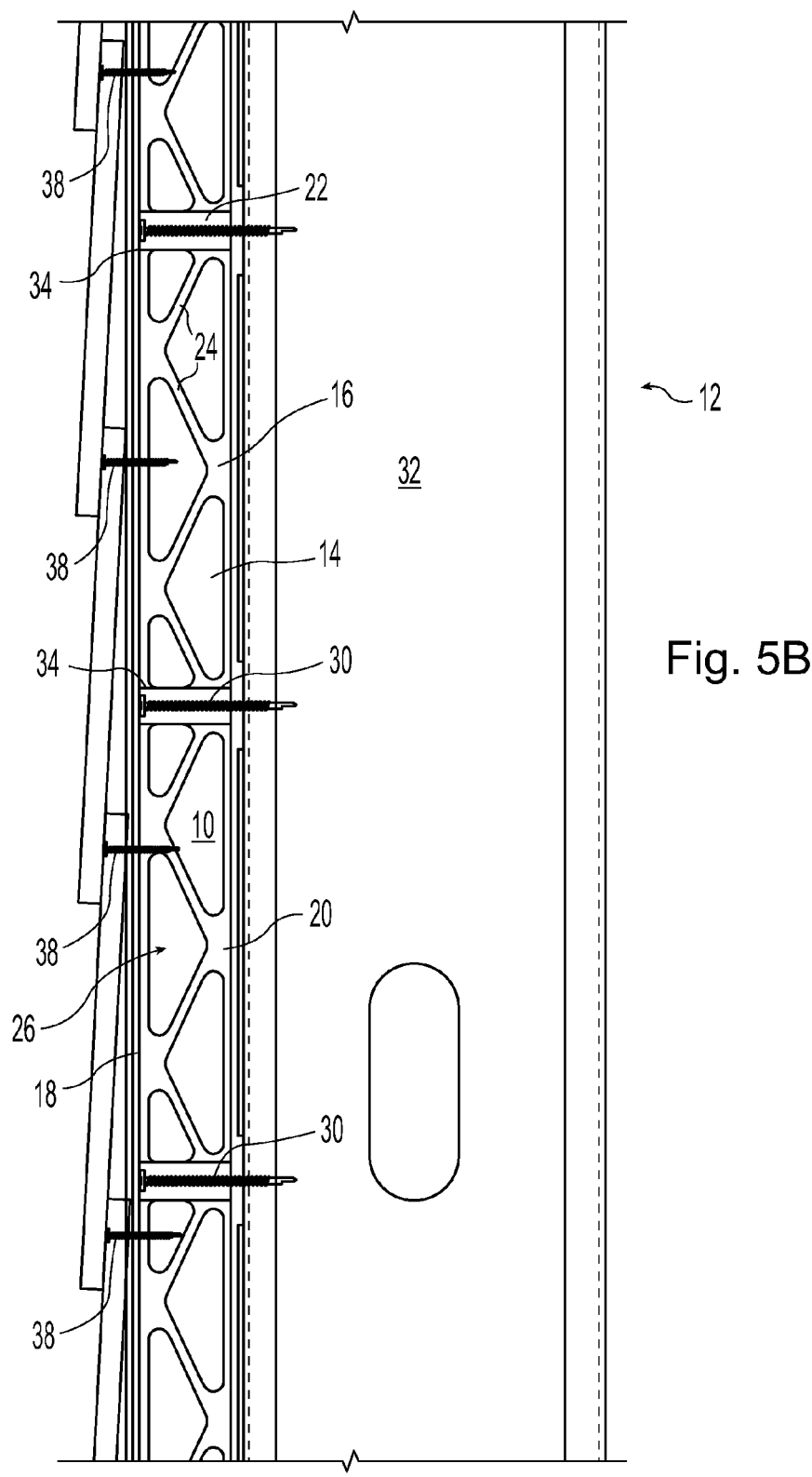
FIG. 5B is a view similar to FIG. 5 of the alternative installation of FIG. 5A.
Figure 6A:
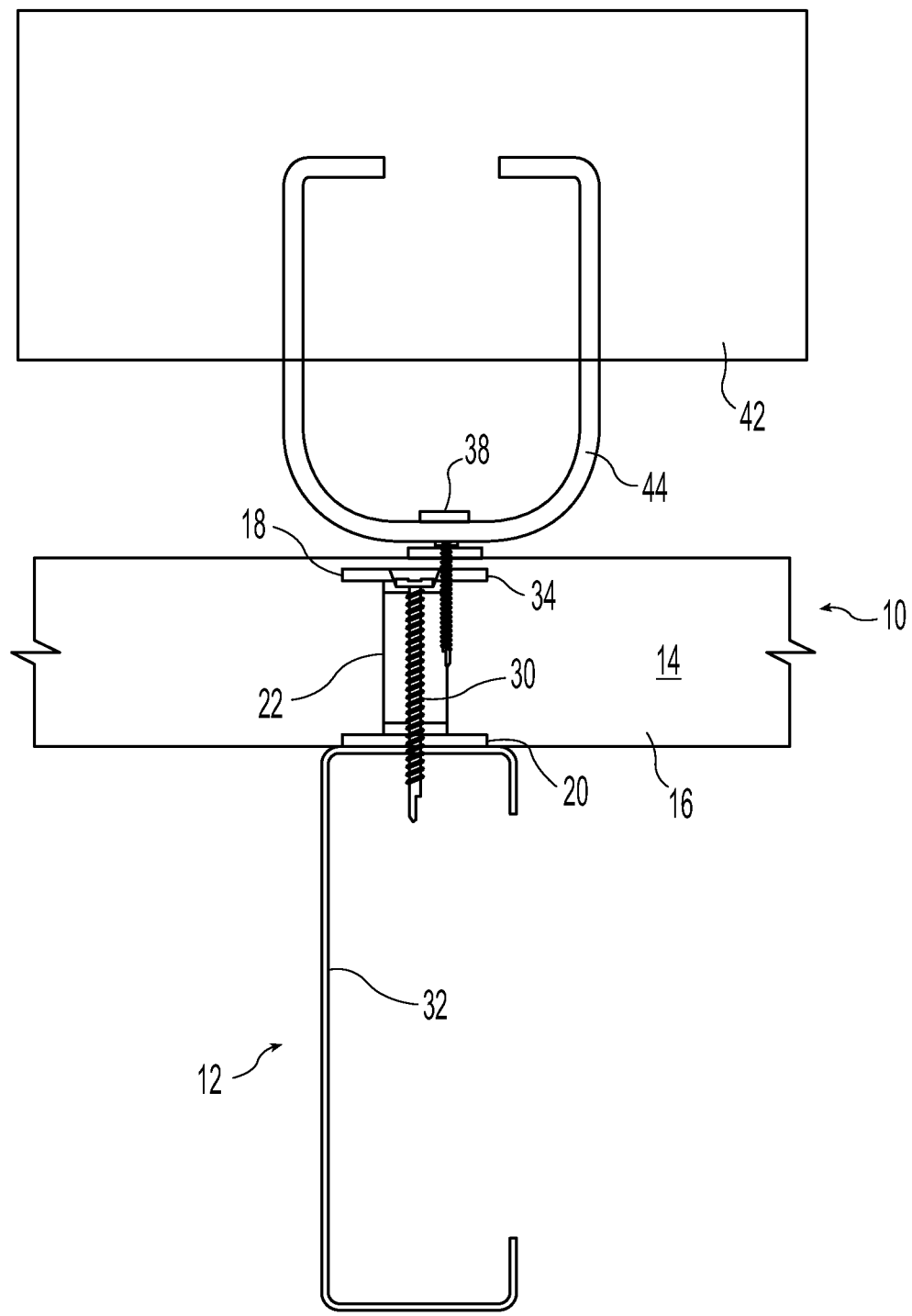
FIG. 6A is a view similar to FIG. 5A of an other alternative installation of an insulation sheet with a brick veneer.
Figure 6B:
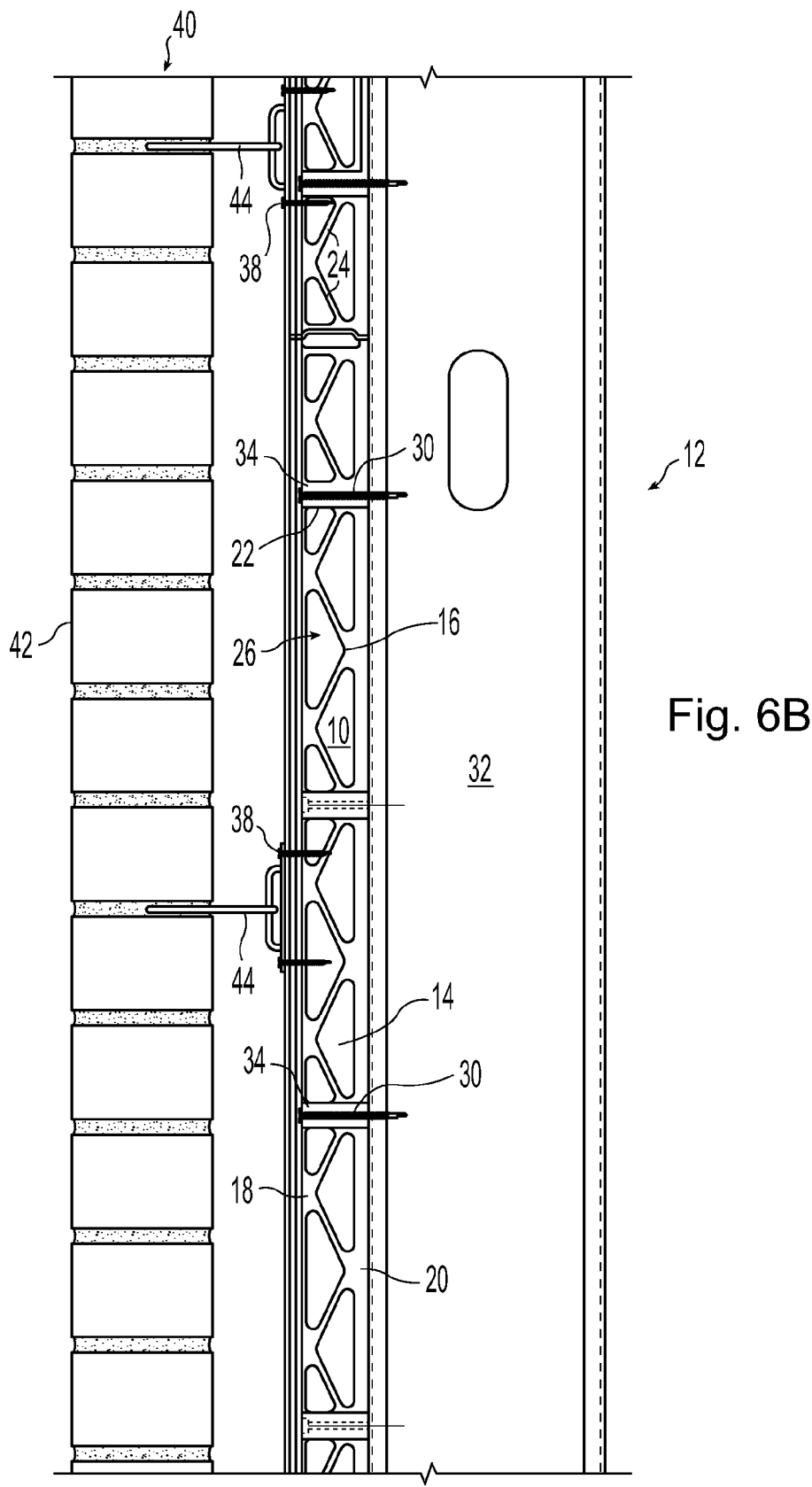
FIG. 6B is a view similar to FIG. 6 of the other alternative installation of FIG. 6A

Each cross member 22 and at least a virtual passage 28 therein may be shaped to cause the insulating panel to be place under compressive loading when fastened by first fasteners 30 to a building structure. The passages 28 are adapted such that an exterior end 34 of each of the first fasteners 30 is generally flush with the exterior surface 36 of the main body 14 when the first fastener 30 is received in the passages 28 for mounting of the insulating panel 10 to the building structure, as shown in FIGS. 4 and 5, or as shown in the alternative installation in FIGS. 5A and 5B. Alternatively, the passages 28 may be adapted such that the exterior end 34 of the first fastener 30 is recessed below the exterior surface 36 of the main body 14 when the first fastener 30 is received in the passage 28 for mounting of the insulating panel 10 as shown in FIG. 6, or alternatively as shown in other installations in FIGS. 6A and 6B. In any case, the first fasteners will experience less thermal effects from the environment that an exposed fastener to conduct heat or cold through the insulating panel 10.

The insulating panel 10 is adapted to be fastened to building structures by first fasteners 30, and either interior or exterior building materials, such as finishes like wood, synthetic or composite siding may in turn be fastened to the insulating panel 10 with second fasteners 38. Additionally, an exterior veneer, such as brick, stone or similar exterior building sections, may be fastened to the insulating panel 10. The mounting structure 16 is designed to support a siding load with second with fasteners through the mounting structure 16 while inhibiting cold bridging. Because of the higher tensile strength and rigidity of the second polymer forming the mounting structure 16, as compared to the that of the first polymer forming the main body 14, and the compressive loading on fastening with the first fasteners 30, the mounting structure 16 is able to withstand the force(s) exerted by second fasteners 38 in such a manner as to substantially reduce hole elongation and other effects upon the insulating panel 10, as compared to prior insulating panels. This assembly inhibits if not eliminate the formation of cold bridges through the insulating panels, on installation of the insulating panels and an exterior finishing material on the exterior surface of the main body 14. In this example, the mounting structure 16 facilitates attachment without a thermal bridge between the exterior surface and interior surface of the insulating panel.

As best shown in FIG. 6, the exterior support member 18 is adapted to receive the second fastener 38 for supporting an exterior finishing building material or section 40 on the insulating panel 10. In the example shown in FIG. 6, the exterior building section 40 includes a brick veneer 42 attached with a brick tie 44 to the mounting structure 16 of the insulating panel 10, such as with the second fasteners 38 to exterior member 18. However, by selection of embodiment of the insulating panel 10, any suitable exterior finishing material may be supported to the insulating panel 10 with the mounting structure 16 and second fasteners 38. For example, a stone facade or facade of other material may be supported to the insulating panel 10 in a similar manner as the brick veneer 42. Wood, synthetic or composite siding may be supported to the insulating panel 10 by second fasteners 38 that secure the siding to the mounting structure 16.

Additionally, the main body 14 of the insulating panel 10 may include a UV-absorbing additive or have a UV-absorbing coating on the exterior surface 36 and/or the interior surface 37 to avoid degradation of the insulating panel 10 from exposure to UV radiation, such as sunlight. Additionally or alternatively, the insulating panel 10 may include an antioxidant additive or have an antioxidant coating on the exterior surface to avoid degradation from oxidation, such as by exposure to the atmosphere. For example, the additives may be mixed with or included in the polymers that make up the main body 14. Alternatively, the additives may be applied to the exterior surface 36 of the insulating panel 10 after fabrication.

During installation, an insulating panel 10 may be fastened to the portion of a building structure 12 by insertion of first fasteners 30 through passages 28 in the cross members 22 and into the building structure. The exterior end 34 of the first fastener 30 may be generally flush with the exterior surface 36 of the insulating panel 10 or exterior end 34 of the first fastener 30 may be disposed below the exterior surface 36 of the insulating panel 10. As additional insulating panels 10 are fastened to the portion of a building structure 12, the insulating panels 10 may be connected by clips 46, as shown in FIG. 1, and as will be explained further below. The construction insulating panel may also have at least some of the lateral edge portions of the insulating panels overlap so that adjacent panels on a building structure may be overlapping to further reduce the risk of cold bridges through the insulating panels and to provide for added strength. Additionally, the insulating panels may be formed to overlapping upward and downward at edges portions with corresponding rounded concave and convex edges for more secured fit and nest with like insulating panels positioned above and below.

Exterior building materials 40 may engage the insulating panels 10 by second fasteners 38 engaging the mounting structures 16. As shown, in FIG. 2 one or more alignment markings 48 may be disposed on one of the main body 14, particularly in the case where the mounting structure 16 is largely or entirely disposed within the main body 14 as most desired to minimize heat transfer, to indicate the location of the mounting structure 16 for attachment of exterior building sections 40. During attachment of the exterior building materials 40 the second fasteners 38 may be aligned by a respective alignment marking 48 with the mounting structure.

Figure 6C:
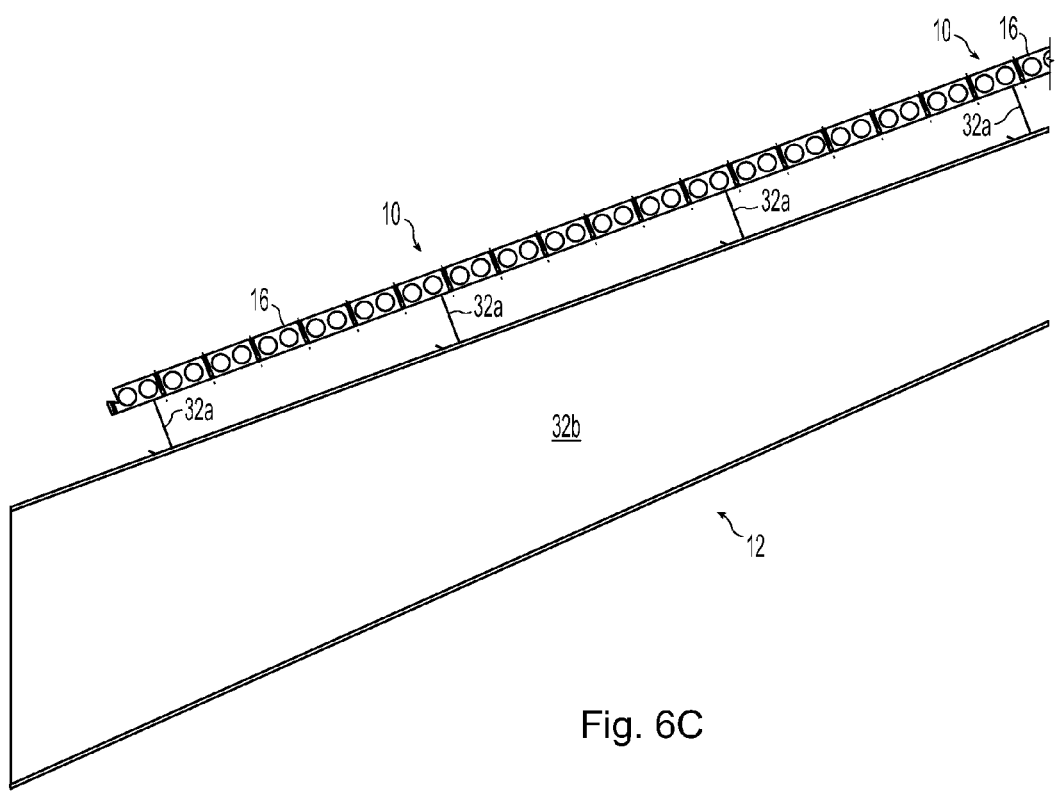
FIG. 6C is a side cross sectional view of an insulation sheet attached to the roof structure of a building.
Figure 6D:
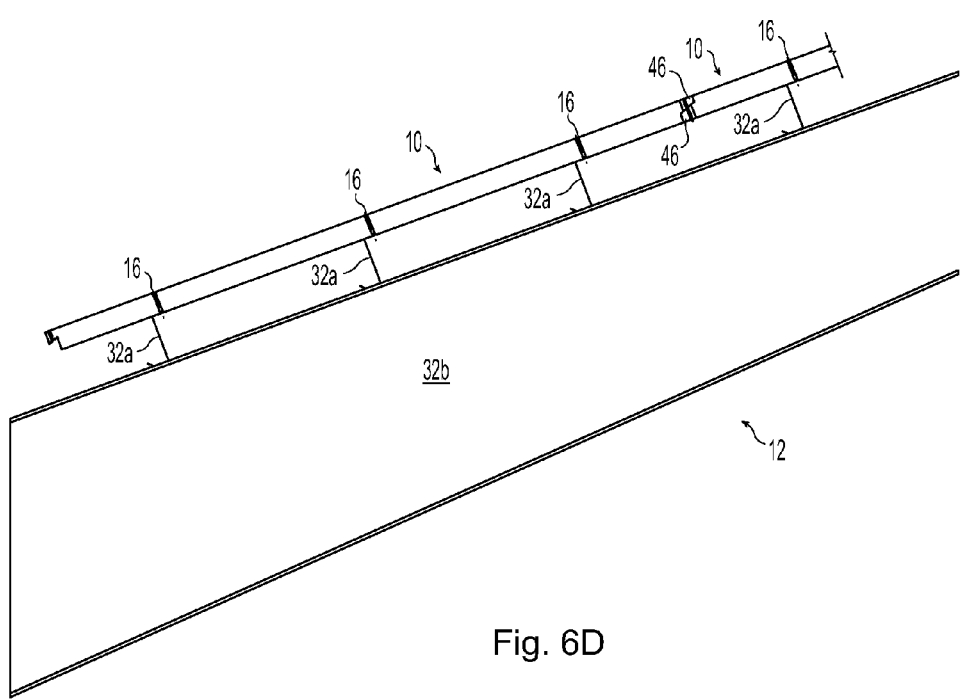
FIG. 6D is a side cross sectional view of an insulation sheet attached to the roof structure of a building in an alternative manner.

As shown in FIGS. 6C and 6D, the insulating panel 10 may be attached to the roof structure of a building, such as to a metal building frame 32b via purlins 32a. The mounting structures 16 may run laterally across to the purlins 32a as shown in FIG. 6C, the mounting structures 16 may run substantially parallel to the purlins 32a as shown in FIG. 6D, or in any other suitable orientation.

Figure 7A:
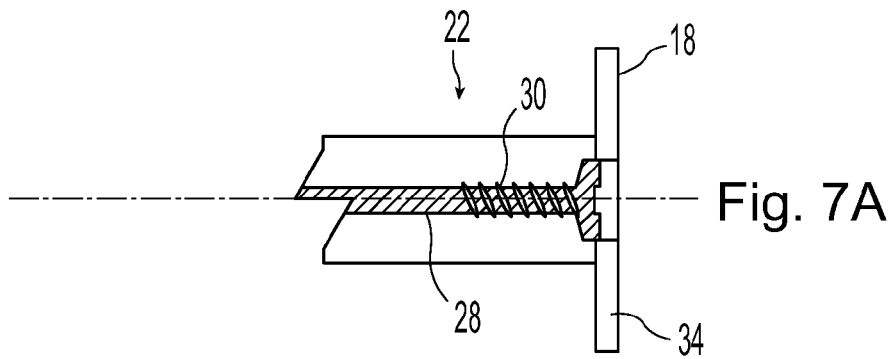
FIG. 7A is a partial side cross sectional view of a cross member including a tapered fastener.
Figure 7B:
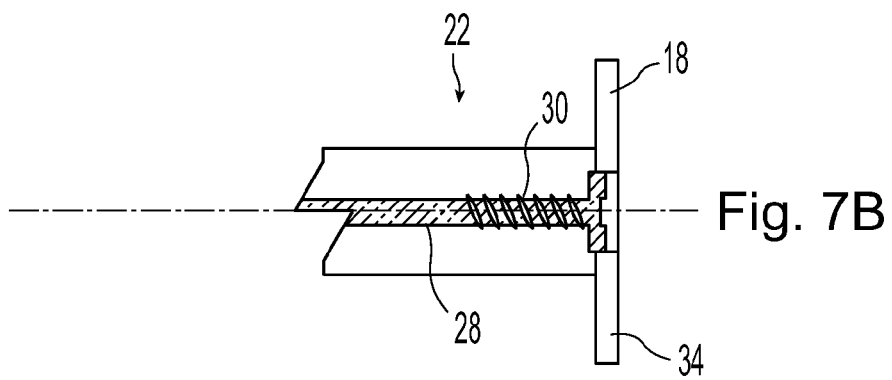
FIG. 7B is a partial side cross sectional view of a cross member including a flat fastener.
Figure 7C:
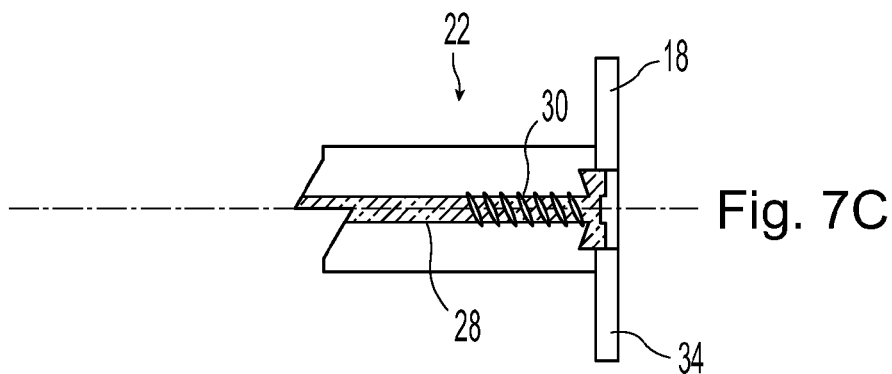
FIG. 7C is a partial side cross sectional view of a cross member including an undercut fastener.

In any case, a variety of fasteners may be used for first fasteners 30 with the insulating panels 10. For example the first fastener 30 in the cross member 22 may be tapered, as shown in FIG. 7A, flat, as shown in FIG. 7B, or undercut, as shown in FIG. 7C.

Also, a durable film may have a pre-applied adhesive or an adhesive applied as the film is applied on exterior surface 36 or interior surface 37, or both. The film provided a moisture barrier and also adds durability and strength to the insulating panel. The film may provide sufficient strength to the insulating panel 10 that the insulating panels may support workers when the insulating panels are in place in a building structure. This film may be particularly helpful where the insulating panels are adapted to be use as sub-roofing over purlins While examples have been explained and illustrated with regard to building sections including CFS studs, it must be understood that building types other than metal or wood buildings structures are contemplated for use with the insulating panels 10. The higher tensile strength and rigidity of the second polymer forming the mounting structure, as compared to the tensile strength and rigidity of the first polymer forming the main body 14, allows for the transfer of the load of the exterior building materials 40 to the building structure 12, rather than the main body 14. The first fasteners 30 may be seated through the mounting structures 16 to the building structure 12 with such force that the mounting structures 16 are "pre-compressed", during installation of the insulating panels 10 and before attachment of the exterior building materials 40. The main body 14 may thus rebound around the heads of the first fasteners 30 after the first fasteners 30 are installed.

Figure 8A:
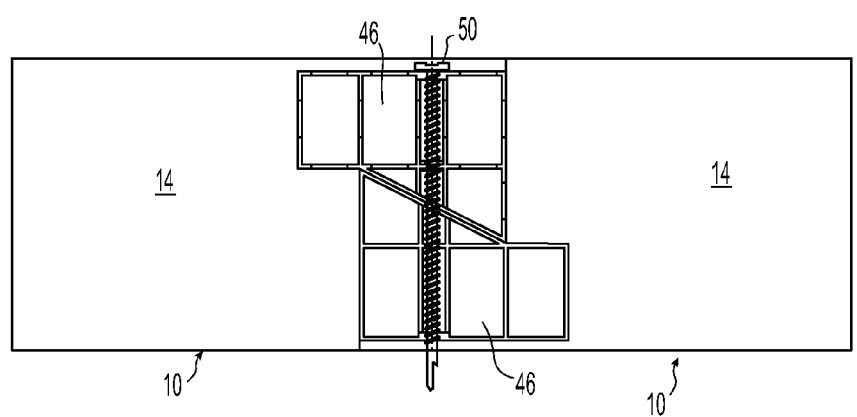
FIG. 8A is a top cross sectional view of assembled overlapping edge portions of adjacent insulation panels.
Figure 8B:
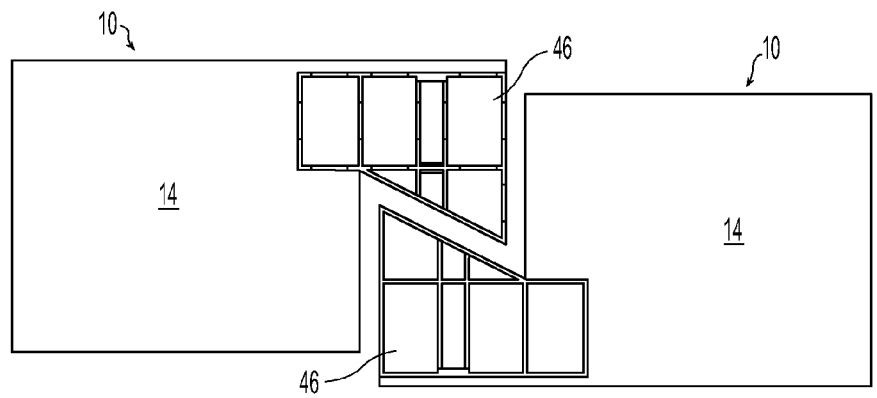
FIG. 8B is a top cross sectional view of the overlapping edges portions shown in FIG. 8A prior to assembly.

In any case, the insulating panels 10 may be aligned in a saw tooth overlapping fashion, as shown in FIGS. 8A and 8B, and/or staggered splice, as shown in FIG. 1 and joined with clips 46 and a clip fastener 50. Additionally, it is to be understood that the joints of adjacent panels may be treated with any appropriate sealing treatment, such as, but not limited to, caulking, taping and the like. The overlapping panels and/or the sealing treatment provide for increased resistance to cold bridges and air or moisture transfer through the insulating panels 10.

While principles and modes of operation have been explained and illustrated with regard to particular embodiments, it must be understood, however, that this may be practiced otherwise than as specifically explained and illustrated without departing from its spirit or scope.

What is claimed is:

1. A construction insulating panel comprising:
   a main body formed of a first polymer having an exterior surface and an interior surface forming the opposite major surfaces of an insulating panel; and
   a mounting structure formed of a second polymer having a higher tensile strength and rigidity than the first polymer, the mounting structure comprised of at least one interior support member positioned adjacent the interior surface of the main body, at least one exterior support member positioned adjacent the exterior surface of the main body and a plurality of spaced apart cross members extending between the interior support member and the exterior support member each having at least a virtual passage configured to receive first fasteners to fasten the mounting structure to a building structure wherein the first fasteners are recessed below the outer surface of the main body under compressive loading to inhibit cold bridging, the mounting structure at least partially disposed within the main body and forming with the main body an insulating panel to be fastened to the building structure under such compressive loading and to support an exterior finishing material fastened at the exterior surface of the main body to the mounting structure of the insulating panel.

2. The construction insulating panel as claimed in claim 1 where the mounting structure has webbing between cross members so the mounting structure forms a truss member disposed within the main body.

3. The construction insulating panel as claimed in claim 1 where the cross members are shaped to cause the mounting structure to resist compressive loading and support the insulating panel when the mounting structure is fastened to a building structure.

4. The construction insulating panel as claimed in claim 1 where the cross members and the at least one virtual passage therein are shaped to cause the mounting structure to resist compressive loading and support the insulating panel when the mounting structure is fastened to a building structure.

5. The construction insulating panel as claimed in claim 1 where the cross members and the at least one virtual passage therein are shaped to cause the mounting structure to resist compressive loading and support the insulating panel when the mounting structure is fastened by first fasteners to a building structure with exterior portions of the first fastener generally flush with or recessed from the exterior surface of the main body.

6. The construction insulating panel as claimed in claim 1 where said passages in the cross members are all virtual passages.

7. The construction insulating panel as claimed in claim 1 where said passages in the cross members are actual pre-formed passages.

8. The construction insulating panel as claimed in claim 1 where there mounting structure has a plurality of interior support members and a plurality of exterior support members.

9. The construction insulating panel as claimed in claim 1 where the exterior support member is configured to receive second fasteners supporting an exterior building material.

10. The construction insulating panel as claimed in claim 1 where alignment markings are disposed on an exterior surface of the insulating panel to indicate the location of the cross members.

11. The construction insulating panel as claimed in claim 2 where alignment markings are disposed on an exterior surface of the insulating panel to indicate the location of the cross members.

12. The construction insulating panel as claimed in claim 3 where alignment markings are disposed on an exterior surface of the insulating panel to indicate the location of the cross members.

13. The construction insulating panel as claimed in claim 4 where the alignment markings are disposed on an exterior surface of the insulating panel to indicate the location of the mounting structure.

14. The construction insulating panel as claimed in claim 5 where alignment markings are disposed on exterior surface of the insulating panel to indicate the location of the mounting structure.

15. The construction insulating panel as claimed in claim 6 where alignment markings are disposed on exterior surface of the insulating panel to indicate the location of the mounting structure.

16. The construction insulating panel as claimed in claim 1 where the second polymer is a thermoplastic.

17. The construction insulating panel as claimed in claim 16 where the thermoplastic is polypropylene.

18. The construction insulating panel as claimed in claim 1 where the main body includes a UV-absorbing additive.

19. The construction insulating panel as claimed in claim 1 where the main body include UV-coating on the exterior surface.

20. The construction insulating panel as claimed in claim 1 where the main body includes an antioxidant additive.

21. The construction insulating panel as claimed in claim 1 where the main body includes an antioxidant coating on the exterior surface.

22. The construction insulating panel as claimed in claim 1 where at least some of the edge portions of the insulation panel are configured to overlap with adjacent panels on a building structure.

23. The construction insulating panel as claimed in claim 1 where rounded edges are provided along the lateral edge portions of the insulation panel configured to permit adjacent insulating panels to nest with each other.

24. The construction insulating panel as claimed in claim 1 further comprising a film provided over a portion of at least one of the exterior surface and the interior surface of the main body to improve durability of the insulating panel.

* * * * *